Sept. 13, 1966         A. G. WOOD ETAL                3,273,148
                    TERRAIN-VIEWING SYSTEM
Filed Dec. 14, 1959                              3 Sheets-Sheet 1
Fig 1
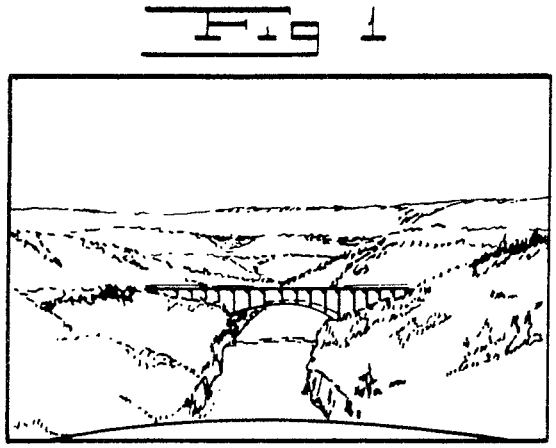
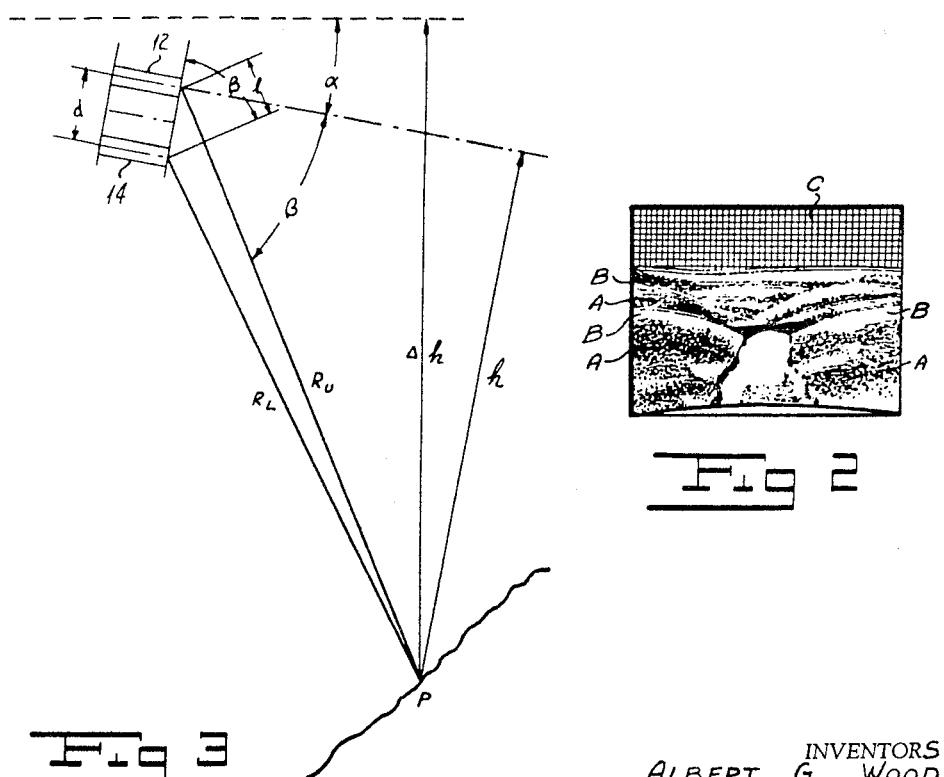
Fig 2
Fig 3
INVENTORS
ALBERT G. WOOD
WILLIAM W. FENN
THOMAS D. KEGELMAN
HOWARD S. HALPERN
ATTORNEY

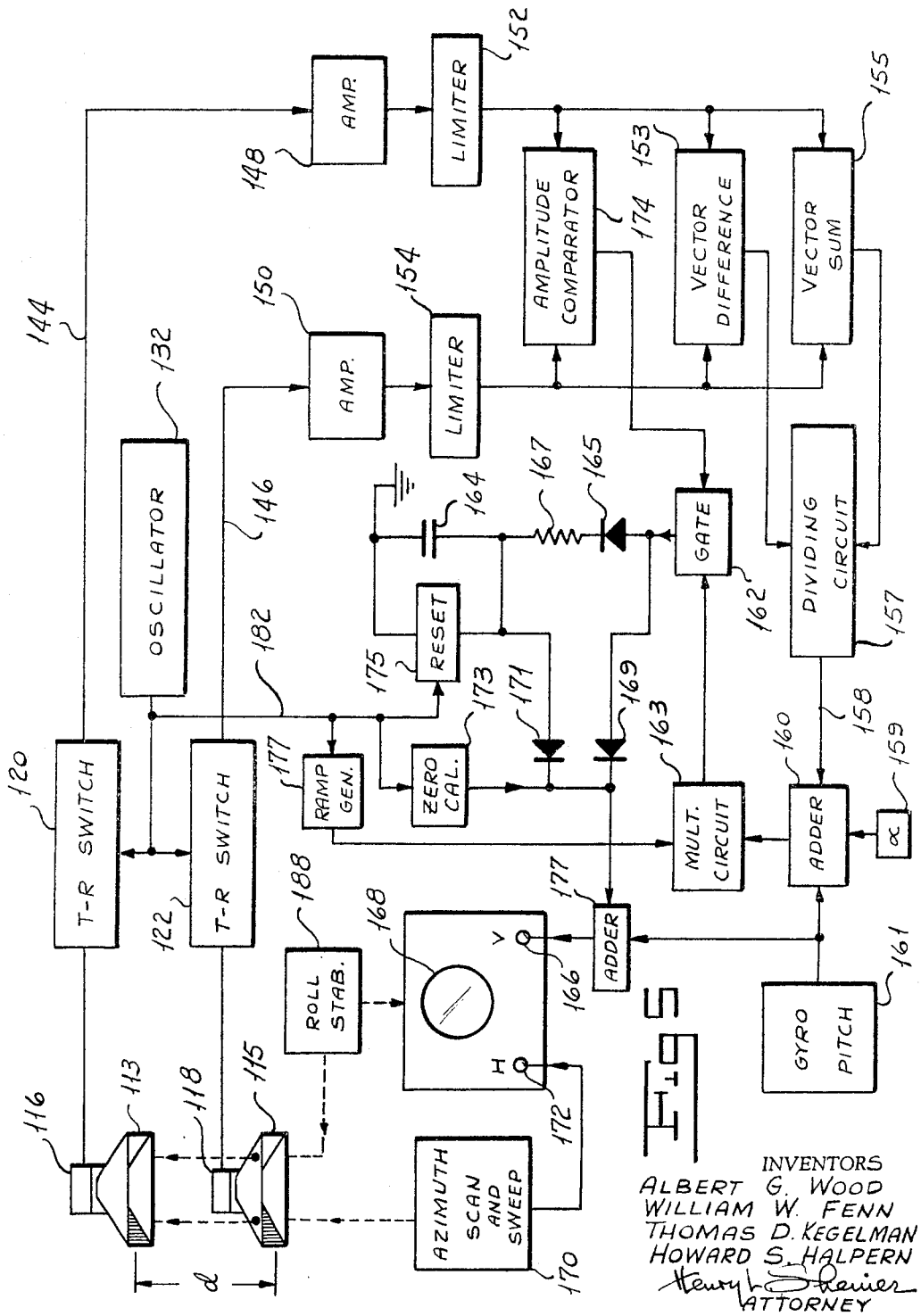

3,273,148
TERRAIN-VIEWING SYSTEM

Albert G. Wood, Pleasantville, N.Y., William W. Fenn, Old Greenwich, Conn., Thomas D. Kegelman, West Nyack, N.Y., and Howard S. Halpern, Stamford, Conn., assignors to United Aircraft Corporation, East Hartford, Conn., a corporation of Delaware
Filed Dec. 14, 1959, Ser. No. 859,489
24 Claims. (Cl. 343—11)

This application is a continuation-in-part of our copending application, Serial No. 757,485, filed August 27, 1958, now abandoned.

Our invention relates to a terrain-viewing system and more particularly to a radar or sonar system which provides the pilot of an aircraft or submarine with a clear and readily interpreted picture of the terrain being approached by the craft.

If the pilot of an aircraft were provided with a realistic picture of the terrain being approached by the aircraft, he would be capable of piloting the aircraft as well in foul weather as in clear weather without resistance from the ground. For ready interpretation the picture presented to the pilot should resemble as closely as is possible the view the pilot would have if he were looking directly at the terrain on a clear day. A system providing an aircraft pilot with such a picture would not only be a valuable aid in landing and in navigating but also would be of use to a military aircraft in low altitude attacks. Many attempts have been made in the prior art to produce a radar system which affords the pilot of an aircraft a clear view of the terrain lying ahead of the aircraft. None of these attempts have provided a satisfactory display.

The problem involved in providing a display of the type discussed hereinabove is that of representing three-dimensional terrain, involving azimuth, elevation, and range, on the two-dimensional screen of a display tube. A number of different systems for reproducing terrain on an airborne radar have been proposed in the prior art. For example, it has been suggested that the information be presented as an altitude difference between a horizontal reference plane through the aircraft and the terrain versus slant range for a particular azimuth heading. This system affords an indication of the terrain with respect to the aircraft for a given azimuth. This system embodies the defect that it does not give the pilot information as to whether or not it is safe to change the heading of the aircraft.

In another system it has been suggested that the video signal be gated so that only return from terrain which lies above a certain altitude is displayed in a PPI map of the area being scanned. This display shows only terrain high points and embodies the defect that it gives no indication of the relative altitude of the high points appearing on the display. This PPI display requires interpretation by the pilot which, over terrain having no land-to-sea boundaries is extremely difficult. The PPI display is in many cases superfluous to the pilot for whom a terrain-clearance, radar system is intended.

The use of intensity variations to indicate altitude differences has not been satisfactory since the eye is not a good judge of absolute intensity.

Other systems have used the lack of return from some range increment behind an obstacle to indicate the existence of an obstacle. This system fails against slowly rising terrain. The generated shadow itself cannot indicate the range from the aircraft to the obstacle.

From the foregoing discussion it will be apparent that radar, terrain-viewing systems of the prior art have not proved satisfactory since they do not meet all the requirements of the pilot of the aircraft. None of those systems presents a clear picture of the terrain requiring very little interpretation on the part of the pilot. A good radar, terrain-viewing system must be sufficiently accurate as to inspire confidence in the use of the device. There should be no degradation of performance of the system as the radar beam approaches and leaves the top of an obstacle or the radar horizon. Such a system should present a continuous display of information leaving no gaps. The display of the system should permit immediate assimilation of the clearance situation without need for interpretation. This requirement can be fulfilled by providing a three-dimensional display which will be familiar to a pilot having no radar experience.

Similarly, sonar displays of the prior art have most generally been type A or PPI. While these displays are adequate against surface ships and other floating objects, yet they are not satisfactory for submarines which operate in a three-dimensional medium and require further information to avoid natural underwater obstacles and submerged objects such as mines, and other submarines.

We have invented a radar, terrain-viewing system which presents the pilot of an aircraft with a clear picture of the terrain being approached by the aircraft. Our system affords a display requiring very little interpretation by the pilot. There is no degradation in performance of our system as the radar beam approaches and leaves the crest of an obstacle or at the radar horizon. All ridges and hilltops are clearly outlined, near slopes are darkened and receding slopes are brightened, if they are visible. The horizon shows as a bright line dividing the variably shaded land from the black sky.

We have invented a sonar, terrain-viewing system which presents the pilot of a submarine with a clear picture of the ocean floor within the usual limits of range. No degradation in performance results from the sonar beam approaching the crest of an underwater obstacle. All underwater ridges are clearly outlined. All objects within sonar range are portrayed in coordinates involving elevation angle and azimuth.

One object of our invention is to provide a radar, terrain-viewing system which affords the pilot of an aircraft a clear picture of the terrain being approached by the aircraft.

Another object of our invention is to provide a radar, terrain-viewing system which affords a picture requiring very little interpretation.

A further object of our invention is to provide a radar, terrain-viewing system in which the crests of ridges and hills are emphasized.

A still further object of our invention is to provide a radar, terrain-viewing system in which near slopes are darkened.

Still another object of our invention is to provide a radar, terrain-viewing system which continuously displays information without gaps.

Still a further object of our invention is to provide a sonar, terrain-viewing system which affords a clear, continuous, and easily interpreted picture wherein underwater ridges are emphasized and all objects within sonar range are portrayed in a natural coordinate system.

Other and further objects of our invention will appear from the following description.

In general, our invention contemplates the provision of a terrain-viewing system including a vertical monopulse antenna having upper and lower reflected signal sensors. We provide the antenna with a conventional azimuth scanning motion. The angle between the antenna boresight line and a longitudinal reference line fixed with respect to the aircraft or submarine is a fixed or slowly varying angle. The elevation angle between the antenna boresight line and the instantaneous center of return is a rapidly varying angle because the instantaneous center of return moves, during a single pulse, over the entire terrain illuminated by the pulse.

We obtain a measure of the angle between the antenna boresight line and the instantaneous center of return by determining the phase difference between the signals received by the respective upper and lower reflected signal sensors. Some predetermined function of this phase difference is then applied to the vertical deflection plates or coil of a display tube. Thus our vertical sweep is controlled by the vagaries of the terrain from the nearest point of return out towards the horizon or to the limits of the signal-to-noise ratio.

We obtain the display tube horizontal deflection signal in a conventional manner from the azimuth-scanning system. With signals applied to the display tube, the picture closely resembles the view a pilot would have of the terrain on a clear moonlit night.

In the accompanying drawings which form part of the instant specification and which are to be read in conjunction therewith and in which like reference numerals are used to indicate like parts in the various views:

FIGURE 1 is a view of the terrain being scanned as seen by the naked eye on a clear moonlit night.

FIGURE 2 is a view of the display provided by our radar, terrain-viewing system.

FIGURE 3 is a diagrammatic view illustrating the manner in which we obtain the elevation angle signal in our terrain-viewing system.

FIGURE 5 is a schematic view showing one form of our sonar, terrain-viewing system.

Figure 4:
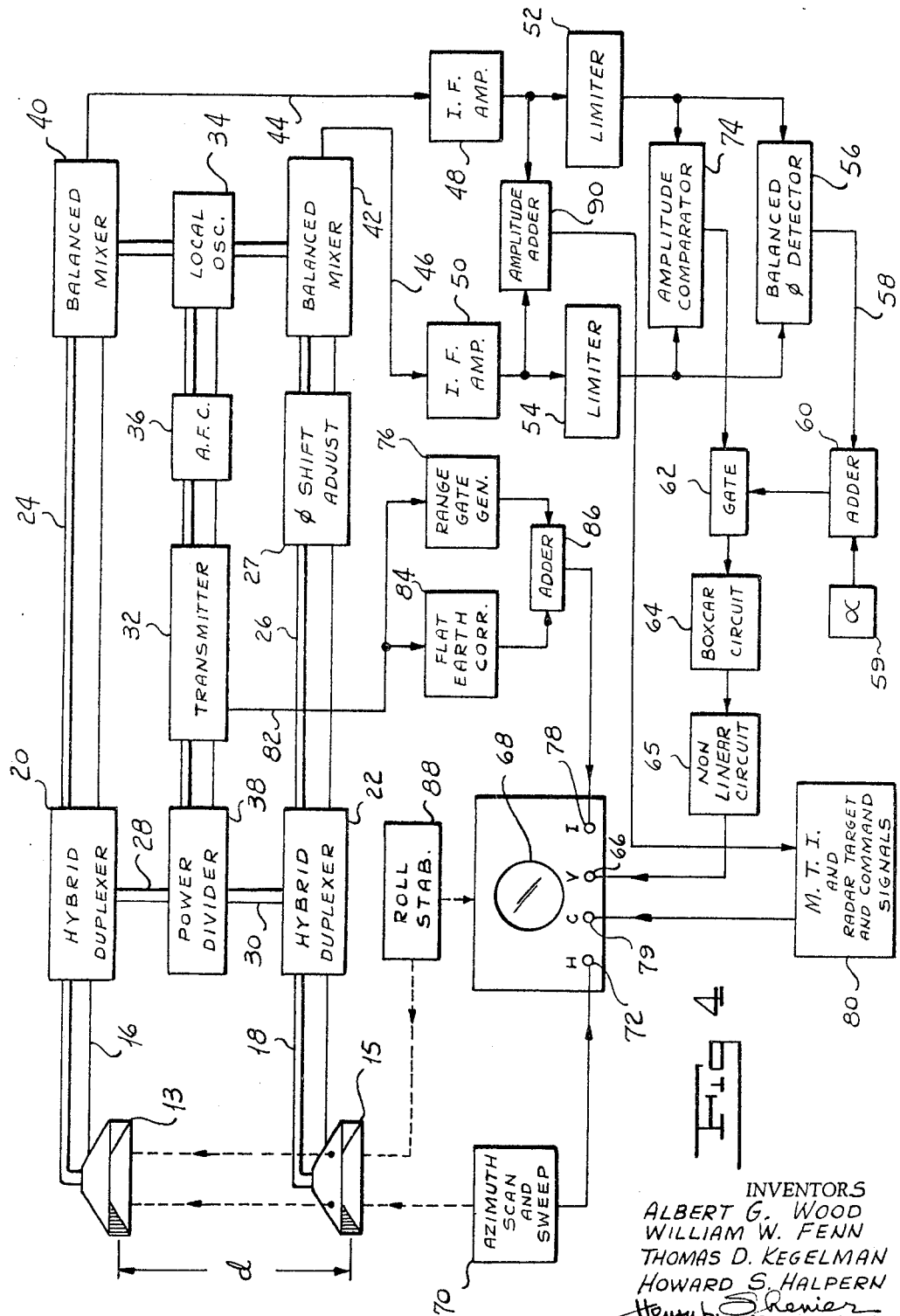
FIGURE 4 is a schematic view showing one form of our radar, terrain-viewing system.

As has been explained hereinabove, in our system we develop a deflection voltage which is a function of the elevation angle of the instantaneous center of return of the reflected signal. Referring now to FIGURE 3 of the drawings, the receiving system of our system includes an upper signal sensor 12 and a lower signal sensor 14. We have indicated the fixed longitudinal reference line in the craft by the broken line in FIGURE 3 and have shown the antenna boresight line as a dot-dash line. From the figure it can readily be seen that the space lag $l$ between the signal received by the upper sensor 12 and the signal received by the lower sensor 14 is determined by the relationship:

(1)
$$l = d \sin \beta = \frac{\Delta\phi}{360°}\lambda$$

where $d$ is the distance between the pair of sensors, $\beta$ is the angle between the instantaneous center of return P and the antenna boresight line, $\Delta\phi$ is the phase difference between the signals received by the respective pair of sensors, and $\lambda$ is the carrier wave length of the system. From Equation 1 it can readily be seen that the angle $\beta$ may be determined by measuring the phase difference $\Delta\phi$ between the signals received by the respective upper and lower sensors 12 and 14.

Referring now to FIGURE 4, respective wave guides 16 and 18 feed the energy received by the respective horns 13 and 15 to hybrid duplexers 20 and 22. As is known in the art, each hybrid junction 20 and 22 may be arranged to couple energy from its associated wave guides 16 and 18 to a respective receiver input circuit wave guide 24 or 26 without transferring energy to its associated transmitter output circuit wave guide 28 or 30. Each of the junctions 20 and 22 includes a suitable transmit-receive device which permits energy to be coupled from guide 28 to guide 16 and from guide 30 to guide 18, respectively. The transmitter 32 of our system controls the frequency of a local oscillator 34 through an automatic frequency control circuit 36. A power divider 38 couples energy from the transmitter 32 to the respective duplexers 20 and 22.

The wave guides 24 and 26 supply respective balanced mixers 40 and 42 which heterodyne the signals of the respective wave guides 24 and 26 with the output of the local oscillator 34. The intermediate frequency output signals of mixers 40 and 42 are coupled by conductors 44 and 46 to the inputs of wide-band and low phase shift intermediate frequency amplifiers 48 and 50, respectively. As has been explained hereinabove, the required vertical deflection signal is determined by the phase difference $\Delta\phi$ between the signals received by the respective upper and lower horns 13 and 15. In order to prevent the relative amplitudes of the intermediate frequency signals from affecting the elevation angle deflection signal, we pass the respective limiters 52 and 54, which, as is known in the respective output signals of amplifiers 48 and 50 through art, clip the waves to the same amplitude. We feed the respective, clipped, intermediate frequency signals to a balanced phase detector 56, which, as is known in the art, produces an output signal representing the phase difference between the input signals. A phase shift adjustment 27 is provided in wave guide 26 to balance the system so that the output of phase detector 56 is zero when $\beta$ is zero, for example. From the foregoing discussion it will be apparent that the output channel 58 of the phase detector 56 normally carries a signal which is a measure of the angle $\beta$ between the antenna boresight and the instantaneous center of return. In order to provide a deflection voltage which is proportional to the angle between the longitudinal fixed reference line and the instantaneous center of return, we pass the signal on the output channel 58 through a circuit 60 which adds to this signal a bias from a source 59 which provides a voltage proportional to the angle $\alpha$ between the antenna boresight axis and the aircraft reference line.

A gating circuit 62 normally passes the sum output signal on the output channel of circuit 60 to a boxcar circuit 64, the output signal of which is coupled through a nonlinear circuit 65 to the vertical deflection terminal 66 of a display tube 68. An azimuth scan and sweep generator 70 causes the antenna system to scan in azimuth and produces a corresponding signal which is applied to the horizonal deflection terminal 72 of display tube 68.

It is desired that the pattern of transmitted radiation be a vertical knife-like plane subtending a small azmuth angle for highest resolution. Accordingly, horns 13 and 15 are shown shaped to produce such pattern. Alternatively, as is well known to the art, this directivity pattern may be produced by an antenna reflector which may provide cosecant-squared illumination, if desired, along the knife-like vertical plane. A roll stabilizer 88 maintains the horns 13 and 15 in a vertical disposition so that the radiation pattern remains a vertical plane. In order that the display rotate with aircraft roll displacement, the roll stabilizer 88 is coupled to the display tube 68. As is well known in the art, the picture may be rotated either by revolving the entire picture tube 68, or, if magnetic deflection is used, by revolving the deflection yoke. Thus the picture is apparently not stabilized and will tilt as the aircraft rolls.

From the foregoing it will be seen that the vertical position of the cathode-ray tube illuminated spot is a measure of the angle $\alpha$ plus $\beta$ between the aircraft reference line and the instantaneous center of return. Each pulse causes the illuminated spot to trace a vertical line representing the ground from the nearest point of return of the radar beam to the horizon. In the system as considered so far, the intensity of the beam is nominally constant. The rate at which the angle $\beta$ changes, and thus the rate at which the signal applied to terminal 66 changes, is a function of the terrain. It will be apparent that $\beta$ changes rapidly as the instantaneous center of return sweeps up the near side of a hill being approached and changes less rapidly as it sweeps over the crown of the hill. As a result, the spot of the cathode-ray tube is deflected rapidly through the distance on the display tube corresponding to the elevation angle increment of the near side of the hill and less signal as the beam passes over the crest of a hill or the top of an obstruction, further to emphasize this change in terrain. As a result, the picture appearing to the pilot as is shown in FIGURE 1 includes dark, steep slopes and relatively lighter crests with highlighted ridges. Sharp vertical obstructions appear dark with a bright line along the top surface. In addition, the boxcar circuit produces a bright line dividing the relatively lighter terrain from the black sky. Consequently, a natural and familiar picture is presented which requires little interpretation by the pilot. Further, the range lines at preselected intervals enable the pilot to judge the distance to the various terrain features shown on the screen. As the craft dives and climbs, the horizon will move up and down. As the craft rolls left and right, the horizon will tilt right and left.

Other information can be superimposed upon the terrain clearance presentation. Examples of such superimposed signals are command signals, moving target indication signals, and radar return amplitude signals. The input signals to be superimposed upon the picture are thus shown in the coordinates of the terrain clearance presentation. In FIGURE 4 the signals to be superimposed are obtained from circuit 80. The outputs of intermediate frequency amplifiers 48 and 50 are combined in an amplitude adder and impressed on circuit 80 in order to obtain in a radar return amplitude indication. The output of circuit 80 is connected to the color control terminal 79 of display tube 68. It will be appreciated that the output of circuit 80 may also be connected to the intensity control terminal 78.

As will be appreciated by those skilled in the art, the energy from the transmitter 32 could, with equal advantage, be radiated from a third and separate antenna feed horn to illuminate a vertical plane of small azimuthal increment. In such event horns 13 and 15 would merely receive the reflected radiation transmitted from the third feed horn; and duplexers 20 and 22 would be merely on-off type switching devices.

Nonlinear circuit 65 may be used to correct for error introduced by the second term of Equation 4 and for possible error introduced by equipment non-linearities. Circuit 65 may comprise a biased diode network or other nonlinear device as is well-known to the art. Circuit 65 introduces some foreground compression to reduce the flat-earth intensity correction and to expand the remainder of the display. The flat-earth intensity correction circuit 84 and the non-linear vertical sweep circuit 65 cooperate to correct for the foreground darkening effect of the second term of Equation 4.

Other aircraft will be visible in the display. Generally return from another aircraft will be accompanied by a ground return if the terrain at the same distance as the other aircraft is not in radar shadow. However, aircraft make good radar targets, while the ground return is relatively weak. Thus the aircraft return will predominate. The cathode-ray tube beam will be momentarily deflected upwardly. Since this deflection is so brief, the other aircraft would hardly be visible in the display. However, the large output of adder 90 causes circuit 80 to color and to intensify the aircraft return. Hence another aircraft will clearly appear as a bright, colored spot. Because of the simultaneous ground return, another aircraft will be presented slightly below its true position; but the error in elevation angle will generally be insignificant, since ground return will usually be small compared with the return from the other aircraft. The square wave pulse representing another aircraft will cause only a momentary gap in information about the surface of the earth. This creates a black spot in the presentation of terrain at the same distance as the aircraft. By comparing the position of the black spot with the illuminated range lines, the distance of the other aircraft is readily determined.

Referring now to FIGURE 5, we have shown a form of our sonar terrain viewing system in which the coordinates of the display, rather than being elevation angle and azimuth, as in FIGURE 4, are instead altitude or depth and azimuth. We provide a pair of vertical monopulse Fessenden transducers 116 and 118 which, as is well known in the art, are tuned, moving coil, electromagnetic devices adapted for use as underwater sound generators and detectors. Fessenden transducer 116 operates into a directional horn 113; and transducer 118 operates into a directional horn 115. A duplexer, transmit-receive switch 120 is adapted to connect transducer 116 either to conductor 144 or to the output conductor 182 of oscillator 132. A duplexer, transmit-receive switch 122 is adapted to connect transducer 118 either to conductor 146 or to the output conductor 182 of oscillator 132. Since the carrier frequencies employed are usually less than 100 kilocycles, there is no need for heterodyne frequency conversion as in the radar application of FIGURE 4. Conductor 144 is connected to the input of an amplifier 148; and conductor 146 is connected to the input of amplifier 150. Amplifiers 148 and 150 preferably have wide-pass bands centered at the carrier frequency and thus introduce low phase-shift and hence low differential phase-shift. The outputs of amplifiers 148 and 150 are clipped by respective limiters 152 and 154 to equal amplitudes. The outputs of limiters 152 and 154 are impressed upon an amplitude comparator 174. The outputs of limiters 152 and 154 are also impressed upon a vector difference circuit 153 which, as will be appreciated by those skilled in the art, linearly combines the outputs of the limiters with due regard to the phase angles of the signals. The outputs of the limiters are further impressed on a vector sum circuit 155 which, as will be appreciated by those skilled in the art, linearly combines the outputs of the limiters with due regard to the phase angles of the signals. A dividing circuit 157 is responsive to the outputs of the vector difference circuit 153 and the vector sum circuit 155 and provides on output conductor 158 a signal equal to the output of circuit 153 divided by the output of circuit 155. Dividing circuit 157, as will be appreciated by those skilled in the art, may comprise an implicit feedback multiplying circuit which multiplies the output of circuit 155 by an assumed value of the quotient and compares this product with the output of circuit 153 to drive a high gain amplifier for supplying the assumed value of the quotient. Such multiplying circuits are well known in the art and may comprise, for example, a modulator which is supplied with a first frequency voltage of an amplitude proportional to the assumed value of the quotient and a second frequency voltage proportional to the output circuit 155 and is tuned to the difference frequency or the sum frequency to extract the product. It can be shown that the vector difference divided by the vector sum is equal to the tangent of one-half the phase angle $\Delta\phi$. Since the tangent of a small angle is approximately equal to the angle expressed in radians, the output of dividing circuit 157 which appears on conductor 158 is approximately proportional to $\Delta\phi/2$. Both the multiplying circuit 163 and the dividing circuit 157 should be phase-sensitive, two-quadrant devices for producing both positive and negative signal outputs. An adder 160 combines the output signal on conductor 158 with a voltage from source 159 which is proportional to the angle $\alpha$ between the horizontal axis of the submarine and the antenna boresight axis and further with the pitch output signal from a vertical gyro horizon 161. Thus the output of adder 160 indicates the angle of the instantaneous center of return of reflected sound relative to a true horizontal plane. The transmitted output pulse from oscillator 132 appearing on conductor 182 synchronizes a linear ramp generator 177 which produces a saw-tooth rising voltage with substantially constant slope with increasing time. The out-rapidly through the distance on the tube corresponding to the elevation angle increment at the crown of the hill. Owing to this action, the picture brightness varies with variation in the rate of change of the elevation angle. This causes the crown of the hill to be highlighted; and the intensity of the beam at any point on the display affords a measure of the slope of the terrain at that point.

We have illustrated this characteristic of our system in FIGURE 2, which is the picture presented to the pilot by our system when scanning an area such as is shown in FIGURE 1. In FIGURE 2 the areas A representing the near sides of hills are shown as being relatively dark as compared with the areas B representing the crowns of hills. The area C representing the sky above the horizon has been hatched to indicate black.

We have pointed out hereinabove that the angle $\beta$, and thus the signal applied to terminal 66, varies with a change in the slope of the terrain. This fact may readily be demonstrated analytically. As can be seen by reference to FIGURE 3, the relationship between the angle $\beta$, the slant range R and the distance $h$ of the instantaneous center of return from the antenna boresight extended is (2) $$\sin \beta = \frac{h}{R}$$

To find the rate of change of the elevation angle with respect to time, we differentiate Equation 2 to arrive at the expression (3) $$d\beta/dt = \frac{R\,dh/dt - h\,dR/dt}{R^2 \cos \beta}$$

The term $dR/dt$ is half the velocity of light C for radar applications and is half the velocity of sound in water for sonar applications. Substituting for $dR/dt$ in Equation 3 we obtain (4) $$d\beta/dt = \frac{dh/dt}{R \cos \beta} - \frac{hC}{2R^2 \cos \beta}$$

The first term of Equation 4 contains the terrain slope information. This term corresponds to the rate of change of $\beta$ as the displacement changes as the instantaneous center of return sweeps over the terrain. The second term of Equation 4 contains the error in the desired rate of change of elevation angle during level flight over flat terrain. Since $h/R = \sin \beta$, this second term may also be expressed as $C \tan \beta/2R$. The effect of this second term is to reduce the dwell time of the cathode-ray beam on the foreground display thereby darkening the foreground. This effect may readily be overcome by applying to the intensity control grid 78 of the cathode-ray display tube 68 a flat-earth correction voltage which decreases with time after a transmitted pulse.

We provide our system with means for preventing shadow caused by lack of return when the beam sweeps over the crest of a hill. When the return falls below a predetermined level, the limiting circuits 52 and 54 cease to function and the signals on the output channels of these circuits have different respective amplitudes. It is desirable that this amplitude difference be prevented from affecting the operation of the system and that the vertical deflection voltage be maintained constant until the signal again reaches the level of the limiters. We connect an amplitude comparator 74 between the output signals of limiters 52 and 54. When the return falls below a certain level, an amplitude difference exists in the signals on the output channel of limiters 52 and 54. At this time comparator 74 produces an output signal which is fed to gating circuit 62 to block the output signal from circuit 60. At this time, owing to the lack of any input pulses, the boxcar, pulse lengthening, circuit 64 operates in a manner known to the art to maintain the last signal fed to the circuit until the return again rises above the predetermined level to restore the input to the circuit 64. When this restoration takes place, limiters 52 and 54 again function, causing the output signal of comparator 74 to drop to zero again and permitting the output signal from circuit 60 to pass through the gating circuit 62. As is known in the art, boxcar circuit 64 may comprise a simple storage capacitor. Thus during the period of time an obstacle casts a radar shadow, the boxcar circuit holds constant the vertical deflection voltage of the cathode ray tube. The consequent increase in spot dwell time of the cathode ray tube causes an increase in image intensity and clearly outlines ridges and hilltops.

We provide our system with a range gate generator 76 of any suitable type known to the art which produces pulses at recurrent intervals. We provide a flat-earth correction circuit 84 for producing a voltage which decays with time corresponding to the second term of Equation 4. As is well known to the art, circuit 84 may comprise a simple R-C circuit for producing a decaying exponential voltage. Flat-earth correction and range gate generators 84 and 76 are synchronized by pulses from transmitter 32; and the outputs of these generators are combined in an adder 86 and impressed on the intensity control terminal 78 of the display tube 68. The picture will be of a more uniform brightness without foreground darkening; and a series of bright lines will be produced which mark predetermined ranges. The range lines on the display move more rapidly over the portion of the display representing the near side of hills than against flat terrain at the same distance. These lines are especially useful in flying over flat terrain.

In operation of our radar terrain presentation system, the area to be observed is scanned by azimuth sweep generator 70 which produces a horizontal deflection voltage, causing the cathode-ray tube spot to move across the tube synchronously with movement of the antenna in azimuth. Radar pulses generated in the transmitter 32 are fed through the power divider 38 and through the respective duplexers 20 and 22 to horns 13 and 15 which illuminate a small azimuth increment. Reflected radiation from the instantaneous center of return P is received by the horns 13 and 15 and is fed by the respective guides 16 and 18 through duplexers 20 and 22 to the mixers 40 and 42. Mixers 40 and 42 produce intermediate frequency signals which are fed through amplifiers 48 and 50 to limiters 52 and 54. In normal operation of the system the limiters clip the intermediate frequency signals and feed these signals to the phase detector 56. As has been explained hereinabove, the phase detector 56 produces an output signal which is proportional to the phase difference between its input signals. This signal is a measure of the angle $\beta$ between the instantaneous center of return and the antenna boresight. Circuit 60 adds to this signal a bias voltage from source 59 proportional to the angle between the reference line in the aircraft and the antenna boresight to produce a sum signal which is fed through circuit 65 to the vertical deflecting terminal 66 of the tube 68. This signal at all times indicates the elevation angle of the instantaneous center of return. Each reflected pulse causes the cathode-ray tube spot to trace a vertical line representing the ground from the nearest point of return to the horizon. At the same time, circuit 84 generates an intensity control voltage which compensates for the assumed flat-earth condition to reduce foreground darkening; and generator 76 pulses the intensity control input 78 to produce a series of range lines on the tube 68. The result of this operation is a picture on the tube 68 which resembles the area being viewed as it would appear to the pilot on a moonlit night. Since the vertical deflection signal is proportional to the rate of change of slope of the terrain, the angle $\beta$ changes rapidly as the instantaneous center of return sweeps up the near side of a hill being approached. Consequently, the dwell time of the spot during this portion of its travel is small and the terrain appears dark in this area. At the same time the crest of the hill is highlighted owing to the fact that the spot dwell time increases as the beam passes over the crest of the hill. The boxcar circuit 64 prevents shadows by maintaining the put of ramp generator 177 is an indication of the time elapsed from the transmission of a pulse by oscillator 132 and hence an indication of the range from which reflected sound is received. The outputs of ramp generator 177 and adder 160 are combined in a multiplying circuit 163 which may be similar to the multiplying circuit incorporated in the feedback dividing circuit 157. The output of multiplying circuit 163 is impressed upon a gate circuit 162 which normally passes the signal. The output of gate 162 is connected forwardly through a crystal 165 to the input of a low-pass filter comprising a series resistor 167 and a shunt storage capacitor 164. The output of amplitude comparator 174 controls the operation of gate 162. The output of the low-pass filter is connected forwardly through a crystal 171 to a first input of an adding circuit 177. A transmitted pulse from oscillator 132 appearing on conductor 182 actuates a reset circuit 175 which discharges storage capacitor 164. The output of gate 162 is connected forwardly through a crystal 169 to the first input of adder 177. The pitch output of gyro 161 is connected to a second input of adder 177. The output of adder 177 is connected to the vertical deflection terminal 166 of a display tube 168.

It is desired that the pattern of transmitted sound be a vertically disposed beam subtending a small azimuthal angle. Accordingly, horns 113 and 115 are shown shaped to produce such patterns. An azimuth scan and sweep generator 170 causes the horns to scan in azimuth and also produces a corresponding signal which is applied to the horizontal deflection terminal 172 of the display tube 168. A roll stabilizer 188 maintains the horns 113 and 115 in a vertical disposition so that the sound pattern remains in a vertical plane despite submarine roll. In order that the display also rotate with submarine roll displacement, the roll stabilizer 188 is coupled to the display tube 168. The picture may be rotated either by revolving the entire picture tube 168 or, if magnetic deflection is used, by revolving the deflection yoke. Thus the picture is apparently not stabilized and will tilt right and left as the submarine rolls left and right.

In the form of our invention shown in FIGURE 5, the vertical position of the cathode-ray tube spot is a measure of the depth of the terrain rather than of the elevation angle as in FIGURE 4. In FIGURE 3, if the dotted line represents a true horizontal axis, then the true depth $\Delta h$ of the ocean floor may be expressed as (5) $$\Delta h = R \sin (\alpha + \beta)$$

where R is approximately equal to $R_L$ which in turn is approximately equal to $R_U$. Since the sine of a small angle is approximately equal to the angle expressed in radians, the output of multiplying circuit 163 is approximately proportional to $\Delta h$. The pitch signal from gyro 161 thus adds to the angle $(\alpha+\beta)$ a signal representative of the deviation of the dotted line representing the horizontal axis of the submarine from the true horizon. The intensity of the display varies with the rate of change of depth and hence with the slope of the terrain. A steeply rising ocean floor is painted brighter. Again the crowns of underwater ridges are highlighted; and the intensity of any region in the display is a measure of the slope of the ocean floor in that region.

The picture approximates that which would be presented to an observer at an infinite distance looking through a telescope of infinite magnification. In order to avoid confusion, it is necessary that the cathode-ray tube spot never move downwardly on the display as would tend to happen on the far side of a ridge which is visible from the submarine but which would not be visible to an observer at an infinite distance. Crystal 165 permits storage capacitor 164 to be only positively charged. If the depth of the ocean floor increases, no current can flow backwardly through crystal 165; and capacitor 164 will maintain a constant vertical deflection voltage at terminal 166. Again this will cause highlighting of underwater ridges and other obstructions. Because of the necessary provision of rectifier 165, the storage capacitor 164 must be discharged by reset circuit 175 in response to a transmitted pulse from oscillator 132 appearing on conductor 182. If the far side of an underwater ridge or obstruction is sufficiently steep to be in sonar shadow, then limiters 152 and 154 will not be driven to saturation; and an output signal from comparator 174 will render gate 162 nonconducting so that the output of multiplying circuit 163 is ineffective to change the voltage stored in capacitor 164. Thus all underwater ridges or obstructions will be clearly outlined whether or not the far side is visible from the submarine.

As shown in FIGURE 4, we may provide a range gate generator synchronized by oscillator 132 for producing a series of pulses which may be coupled to the intensity control grid in order to produce range lines which move over the ocean floor. It may also be desirable to provide some nonlinear circuit correction between adder 177 and the cathodes of crystals 169 and 171 to modify the signal at the vertical deflection terminal 166 and perhaps some flat earth intensity correction, as shown in FIGURE 4, to compensate for errors introduced by the approximation that the tangent of half the phase angle is proportional to the sine of the phase angle for that portion of the ocean floor in the extreme foreground where the phase difference $\Delta\phi$ may not be a small angle.

Again, as in FIGURE 4, command signals, moving target signals, and sonar return amplitude signals may be superimposed by either color variation or intensity variation on the display. Other surface ships, mines, and submarines will be visible in the display. Generally, return from such other objects will be accompanied by a return from the ocean floor if the terrain at the same distance as the other object is not in sonar shadow. However, such other objects make good sonar targets, while the return from the ocean floor is relatively weak. Thus the return from such other objects will predominate. The cathode-ray tube beam will be momentarily deflected upwardly by the signal coupled directly through crystal 169. The square wave output pulse of gate 162 cannot appreciably charge capacitor 164, since the low-pass filter operates beyond cutoff for such high-frequency transients. If we failed to provide filter resistor 167, then capacitor 164 would store the peak value of the pulse. Since the capacitor 164 would not be discharged by reset circuit 175 until the next pulse from oscillator 132, the spot would remain in such position, creating a gap in information about the ocean floor at distances beyond such object. In order to preserve continuity in ocean floor information at ranges beyond that of such other object, low-pass filter resistor 167 is provided to prevent the sudden unilateral charging of capacitor 164. The high-frequency transient pulse representing another object is coupled directly through crystal 169, thereby to bypass the low-pass filter comprising resistor 167 and capacitor 164. By means of a sonar return amplitude keying of the intensity grid and the color grid, as in FIGURE 4, such other object will clearly appear as a bright, colored spot. Crystal 169 prevents output loading of filter capacitor 164 when the far side of a ridge has a shallow slope and thus is not in sonar shadow. Crystal 171 prevents the backwards charging of capacitor 164 when a pulse occurs which represents another submarine or a surface ship. Because of the simultaneous return from the ocean floor another object will be presented slightly below its true depth. But the error will generally be insignificant since returns from the ocean floor will usually be small compared with the return from the surface ship or another submarine or a mine. The square wave pulse representing another object will cause only a momentary gap in ocean floor information. This creates a black spot in the presentation at the same distance as the object. By comparing the position of this black spot with the illuminated range lines, the distance of the other object is readily determined.

By some additional circuitry, the depth of the ocean floor or the altitude of the terrain may be shown stabilized relative to some target, rather than relative to the submarine or aircraft. This involves tracking the target in range, elevation, and azimuth. The computed depth or altitude of the craft above the terrain would be subtracted in a differencing circuit from the computed depth or altitude of the craft above the target. These altitude differences would be coupled through a gate to the vertical deflection display input. This gate would be controlled by the computed range to the target, thereby to pass information about terrain lying beyond the target.

In radar applications, the horizon may be from fifteen to one hundred miles distant from an aircraft. At such distances, a small error in measurement of $(\alpha+\beta)$ relative to a horizontal plane will result in a large error in altitude. Such errors in measurement may well be introduced from the gyro horizon itself due to extraneous erection accelerations from maneuvers. Furthermore, because of earth curvature, the horizon may be several thousand feet below a plane tangent to the earth's surface immediately below an aircraft. Thus the horizon may not be presented in the picture; and, if it is presented, there may be considerable error in its positioning. In sonar applications, because of limited range, no signal from the horizon can ever be received. Accordingly, we must generate some zero altitude or zero depth signal to present on the picture a reference line corresponding to an artificial horizon. The oscillator output pulses on conductor 182 are coupled to a zero altitude or zero depth calibration circuit 173, which generates a predetermined voltage corresponding to zero depth only in response to pulses from oscillator 132. The output of zero calibration circuit 173 is coupled to the first input of adder 177. Thus during a transmitted pulse, while capacitor 164 is being discharged by reset circuit 175, the display tube spot will be deflected to a zero depth reference position. The output of calibration circuit 173 may also be impressed on the intensity and color grids of the display tube so that a bright, colored reference line will be produced representing a zero depth, artificial horizon. The depth of underwater ridges may now be compared with the calibration line. If a highlighted underwater ridge is presented above the artificial horizon line, then the pilot of the submarine will appreciate the possibility of collision unless evasive action is taken. The pitch signal from gyro 161 causes the whole presentation to move upwardly when the submarine dives and to move downwardly when the submarine rises. Hence attitude information, including both pitch and roll, is presented. Since the whole picture moves up or down, the distance between underwater ridges and the artificial horizon line will remain constant during changes in pitch attitude.

It will be appreciated that we may provide a radar system having an altitude display, rather than an elevation angle display, by substituting in FIGURE 4 the appropriate circuits shown in FIGURE 5. We may provide a sonar system having an elevation angle display, rather than a depth display, by substituting in FIGURE 5 the appropriate circuits shown in FIGURE 4. Furthermore, a signal proportional to the phase difference angle $\Delta\phi$ may be obtained either by a balanced phase detector, as in FIGURE 4, or by a dividing circuit for obtaining the quotient of a vector sum and a vector difference signal, as in FIGURE 5.

It will be seen that we have accomplished the objects of our invention. We have provided a radar, terrain-viewing system which presents the pilot with a familiar picture. The presentation afforded by our system requires little interpretation.

There is no degradation in the performance of our system as the radar beam approaches the crest of an obstacle or the horizon.

We have provided a sonar, terrain-viewing system which presents a familiar and continuous and readily interpreted picture without gaps or holes due to sonar shadow caused by underwater ridges and obstructions.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A terrain-viewing system including in combination a display tube providing a normally illuminated spot, means for transmitting signals in a downward directed pattern which is a vertical and substantially knife-like plane subtending a small azimuthal angle, a pair of reflected signal sensors disposed in a vertical plane, and means responsive to both reflected signal sensors for vertically sweeping the illuminated spot in an upward direction.

2. A terrain-viewing system including in combination a display tube providing a normally illuminated spot, means for transmitting signals in a downwardly-directed pattern which is a vertical and substantially knife-like plane subtending a small azimuthal angle, a pair of reflected signal sensors disposed in a vertical plane, means responsive to both reflected signal sensors for providing a control voltage varying as a function of the phase angle between the reflected signals received by said sensors, and means responsive to the control voltage for vertically sweeping the illuminated spot in an upward direction.

3. A terrain-viewing system including in combination a display tube having a vertical deflection input terminal, means for transmitting signals in a directional pattern which is a vertical and substantially knife-like plane subtending a small azimuthal angle, a first reflected signal sensor and a second reflected signal sensor both disposed in a vertical plane, a first limiter responsive to the first sensor, a second limiter responsive to the second sensor, means responsive to the first and second limiters for providing a control voltage varying as a function of the phase angle between the reflected signals received by the first and second sensors, a gating circuit having an input and an output, a voltage storage circuit having an input and an output, means coupling the control voltage to the input of the gating circuit, means coupling the output of the gating circuit to the input of the voltage storage circuit, means coupling the output of the voltage storage circuit to the vertical deflection input terminal, and means responsive to the first and second limiters for actuating the gating circuit.

4. A terrain-viewing system including in combination a display tube providing an illuminated spot and having a spot intensity input terminal, means for transmitting signal pulses in a directional pattern which is a vertical and substantially knife-like plane subtending a small azimuthal angle, a pair of reflected signal sensors disposed in a vertical plane, means responsive to both reflected signal sensors for vertically deflecting the illuminated spot, means for generating a voltage which decays with time, means responsive to transmitted signal pulses for synchronizing the decaying voltage generating means, and means coupling the decaying voltage generating means to the spot intensity input terminal.

5. A terrain-viewing system including in combination a display tube providing an illuminated spot and having a spot intensity input terminal, means for transmitting signal pulses in a directional pattern which is a vertical and substantially knife-like plane subtending a small azimuthal angle, a first reflected signal sensor and a second reflected signal sensor both disposed in a vertical plane, means responsive to the first and second reflected signal sensors for vertically deflecting the illuminated spot, range gate generating means for providing voltage pulses at predetermined time intervals, means responsive to transmitted signal pulses for synchronizing the range gate generating means, and means coupling the range gate generating means to the spot intensity input terminal.

6. A terrain-viewing system including in combination a display tube providing a normally illuminated spot and having an input terminal of the type comprising an intensity control input terminal and a color control input terminal, means for transmitting signals in a downwardly directed pattern which is a vertical and substantially knife-like plane subtending a small azimuthal angle, a pair of reflected signal sensors disposed in a vertical plane, means responsive to both reflected signal sensors for vertically sweeping the illuminated spot in an upward direction, and means responsive to the amplitude of reflected signals received by at least one of the sensors for coupling a control voltage to the input terminal.

7. A terrain-viewing system including in combination a display tube providing a normally illuminated spot, means for transmitting signals in a downwardly directed pattern which is a vertical and substantilly knife-like plane subtending a small azimuthal angle, a first reflected signal sensor and a second reflected signal sensor both disposed in a vertical plane, a first limiter responsive to the first sensor, a second limiter responsive to the second sensor, a balanced phase detector responsive to the first and second limiters, and means responsive to the balanced phase detector for vertically sweeping the illuminated spot in an upward direction.

8. A terrain-viewing system for a craft including in combination a display tube providing a normally illuminated spot and having a horizontal deflection input terminal, means mounted on the craft for transmitting signals in a downwardly directed pattern which is a vertical and substantially knife-like plane subtending a small azimuthal angle, a pair of reflected signal sensors disposed in a vertical plane, means responsive to both signal sensors for vertically sweeping the illuminated spot in an upward direction, means for moving the transmitted signal pattern azimuthally relative to the craft, and means responsive to the azimuthal motion of the transmitted signal directional pattern for coupling a voltage to the horizontal deflection input terminal.

9. A terrain-viewing system for a craft including in combination a display tube providing an illuminated spot for presenting a picture, means mounted on the craft for transmitting signals in a directional pattern which is a vertical and substantially-knife-like plane subtending a small azimuthal angle, a pair of reflected signal sensors mounted on the craft and disposed in a vertical plane, means responsive to both reflected signal sensors for vertically deflecting the illuminated spot, roll stabilizing means for maintaining both the transmitted signal directional pattern and the reflected signal sensors in vertical planes, and means responsive to the roll stabilizing means for rotating the picture presented on the display tube.

10. A terrain-viewing system including in combination a display tube providing a normally illuminated spot, means for transmitting signals in a downwardly directed pattern which is a vertical and substantially knife-like plane subtending a small azimuthal angle, a first reflected signal sensor and a second reflected signal sensor both disposed in a vertical plane, a first limiter responsive to the first sensor and providing an output, a second limiter responsive to the second sensor and providing an output, means responsive to the first and second limiters for providing a difference signal equal to the vector difference between the outputs of the first and second limiters, means responsive to the first and second limiters for providing a sum signal equal to the vector sum of the outputs of the first and second limiters, quotient circuit means for dividing the difference signal by the sum signal, and means responsive to the quotient circuit means for vertically sweeping the illuminated spot in an upward direction.

11. A terrain-viewing system for a craft including in combination a display tube providing an illuminated spot, means for transmitting signal pulses in a directional pattern which is a vertical and substantially knife-like plane subtending a small azimuthal angle, a pair of reflected signal sensors mounted on the craft and disposed in a vertical plane, means responsive to the reflected signal sensors for providing a first voltage which varies generally linearly with the angle between the instantaneous center of return of reflected signals and a horizontal plane, means generating a second voltage which increases generally linearly with time, means responsive to transmitted signal pulses for synchronizing the second voltage generating means, product circuit means for multiplying the first voltage by the second voltage, and means responsive to the product circuit means for vertically deflecting the illuminated spot.

12. A terrain-viewing system for a craft having a longitudinal axis including in combination a display tube providing a normally illuminated spot, means for transmitting signal pulses in a downwardly and forwardly directed pattern which is a vertical and substantially knife-like plane subtending a small azimuthal angle, means for receiving reflected signals, and means responsive to the angle between the instantaneous center of return of terrain-reflected signals and the longitudinal axis of the craft for vertically deflecting the illuminated spot.

13. A terrain-viewing system for a craft including in combination a display tube providing a normally illuminated spot, means for transmitting signal pulses in a downwardly directed pattern which is a vertical and substantially knife-like plane subtending a small azimuthal angle, means for receiving reflected signals, and means responsive to the vertical distance between the instantaneous center of return of terrain-reflected signals and a horizontal plane through the craft for vertically deflecting the illuminated spot.

14. A terrain-viewing system for a craft including in combination a display tube having a vertical deflection input terminal, means for transmitting signal pulses in a directional pattern which is a vertical and substantially knife-like plane-subtending a small azimuthal angle, means for receiving reflected signals, means responsive to the vertical distance between the instantaneous center of return of reflected signals and a horizontal plane through the craft for providing a control voltage, a gating circuit having an input and an output, means coupling the control voltage to the input of the gating circuit, a low-pass filter circuit having an input and an output and including a voltage storage element, a unilateral impedance, means including the unilateral impedance for coupling the output of gating circuit to the input of the low-pass filter, means coupling both the output of the gating circuit and the output of the low-pass filter to the vertical deflection input terminal, means responsive to transmitted signal pulses for resetting the voltage storage element, and means responsive to the amplitude of reflected signals for actuating the gating circuit.

15. A terrain-viewing system for a craft including in combination a display tube having a vertical deflection input terminal, means for transmitting signal pulses in a directional pattern which is a vertical and substantially knife-like plane-subtending a small azimuthal angle, means for receiving reflected signals, pitch stabilizing means for determining a horizontal plane through the craft, means responsive to the vertical distance between the instantaneous center of return of reflected signals and the horizontal plane determined by the pitch stabilizing means for providing a control voltage, means responsive to transmitted signal pulses for providing a predetermined voltage, means responsive to the pitch stabilizing means for providing a pitch voltage, and means coupling the vertical distance control voltage and the predetermined voltage and the pitch voltage to the vertical deflection input terminal.

16. A terrain-viewing system for a craft including in combination a display tube providing an illuminated spot, means mounted on the craft for transmitting signal pulses in a directional pattern which is a vertical and substantially knife-like plane subtending a small azimuthal angle, a pair of reflected signal sensors, means responsive to the phase angle between reflected signals received by the pair of sensors for vertically deflecting the spot, means for moving the transmitted signal directional pattern azimuthally relative to the craft and for horizontally deflecting the spot as a function of such relative azimuthal motion, and means for controlling the intensity of the illuminated spot independently of the amplitude of reflected signals.

17. A terrain-viewing system for a craft having a longitudinal axis including in combination a display tube providing an illuminated spot, means for transmitting signal pulses in a directional pattern disposed in a vertical plane and subtending a small azimuthal angle, means responsive to the angle between the instantaneous center of return of reflected signals and the longitudinal axis of the craft for providing a control signal, a gate, a signal storage circuit, means including the gate for coupling the control signal to the storage circuit, means responsive to the storage circuit for vertically deflecting the illuminated spot, and means responsive to the amplitude of reflected signals for actuating the gate.

18. A terrain-recording system including in combination a recording area, means for exciting a spot in the area with a nominally constant intensity, and means for causing the excited spot to scan the area at a speed varying as a function of the slope of terrain.

19. An information recording system including in combination a recording area, means for exciting a spot in the area, a signal source providing a variable output in accordance with the information to be recorded, and means responsive to said output for causing the excited spot to scan the area at varying instantaneous sweep rates.

20. An information recording system including in combination a recording area, means for exciting a spot in the area, means for causing the excited spot to scan the area, a signal source providing a variable output in accordance with the information to be recorded, and means responsive to said output for varying the instantaneous sweep rate of the scanning means.

21. An information recording system including in combination a recording line, means for exciting a spot on the line, a signal source providing a random and widely variable and relatively high frequency output in accordance with the information to be recorded, and means responsive to said output for causing the excited spot to scan the line at varying instantaneous sweep rates.

22. An information recording system including in combination a recording line, means for exciting a spot on the line, a signal source providing a variable output in accordance with the information to be recorded, and means responsive to said output for causing the excited spot to scan the line at varying instantaneous sweep rates.

23. An information recording system including in combination a recording line, means for exciting a spot on the line, a signal source providing a variable output in accordance with the information to be recorded, means for causing the excited spot to scan the line, and means responsive to said output for varying the instantaneous sweep rate of the scanning means.

24. An information recording system including in combination a recording area, means for exciting a spot in the area, a signal source providing a random and widely variable and relatively high frequency output in accordance with the information to be recorded, and means responsive to said output for causing the excited spot to scan the area at varying instantaneous sweep rates.

References Cited by the Examiner

UNITED STATES PATENTS

| | | | |
|---|---|---|---|
| 2,300,189 | 10/1942 | Wolff | 343—100 |
| 2,467,361 | 4/1949 | Blewett | 343—11 |
| 2,480,208 | 8/1949 | Alvarez | 343—5 |
| 2,532,549 | 12/1950 | Higinbotham et al. | 343—5 |
| 2,648,838 | 8/1953 | Raymond | 343—11 |
| 2,724,825 | 11/1955 | Davenport | 343—16.1 |
| 3,088,110 | 4/1963 | Hunter | 343—11 |

CHESTER L. JUSTUS, *Primary Examiner.*

FREDERICK M. STRADER, KATHLEEN CLAFFY,
*Examiners.*

G. J. MOSSINGHOFF, P. M. HINDERSTEIN,
*Assistant Examiners.*